United States Patent [19]
Di Biase

[11] Patent Number: 5,658,633
[45] Date of Patent: Aug. 19, 1997

[54] LOADING DOCK BUMPERS

[75] Inventor: Joseph James Di Biase, Mississauga, Canada

[73] Assignee: Frommelt Industries of Canada Inc., Rexdale, Canada

[21] Appl. No.: 529,537

[22] Filed: Sep. 18, 1995

[51] Int. Cl.$^6$ .................................................. B63B 59/02
[52] U.S. Cl. .......................... 428/68; 114/219; 405/212; 405/215; 428/71; 428/75; 428/76; 428/323; 428/327
[58] Field of Search .................. 428/68, 71, 75, 428/76, 323, 327; 405/212, 215; 114/219; 267/139, 140, 136, 140.3

[56] References Cited

U.S. PATENT DOCUMENTS

| | | | |
|---|---|---|---|
| Re. 24,276 | 2/1957 | Schuyler | 267/1 |
| 2,649,295 | 8/1953 | Schuyler | 267/1 |
| 3,964,422 | 6/1976 | Boyd | 114/219 |
| 4,509,730 | 4/1985 | Shtarkman | 267/35 |
| 4,559,089 | 12/1985 | Dromsky | 428/653 |
| 4,628,850 | 12/1986 | Day et al. | 114/219 |
| 4,844,213 | 7/1989 | Travis | 405/212 |
| 4,893,576 | 1/1990 | Day et al. | 114/219 |
| 5,013,272 | 5/1991 | Watkins | 441/127 |
| 5,094,905 | 3/1992 | Murray | 428/218 |
| 5,247,897 | 9/1993 | Pepp | 114/219 |
| 5,264,259 | 11/1993 | Satoh et al. | 428/34.5 |
| 5,269,248 | 12/1993 | Lee | 114/219 |

FOREIGN PATENT DOCUMENTS

| | | | |
|---|---|---|---|
| 3-25112 | 2/1991 | Japan | 405/212 |
| 92747 | 11/1959 | Netherlands | 405/215 |

*Primary Examiner*—Nasser Ahmad
*Attorney, Agent, or Firm*—Marcelo K. Sarkis; Ivor M. Hughes; Neil H. Hughes

[57] ABSTRACT

A loading dock bumper comprising:
 (a) a first shell made of a substantially non-elastic material
 (b) a second shell made of a substantially non-elastic material, said first and said second shells being resiliently attached to each other, forming a housing, and
 (c) a predetermined effective amount of a particulate resilient material contained within said housing formed by said first and said second shell in a substantially compressed mode.

2 Claims, 4 Drawing Sheets

LOADING DOCK BUMPERS

BACKGROUND OF THE INVENTION

The present invention relates generally to a loading dock bumper used for cushioning the impact of a vehicle, for example a transport vehicle, when positioning up against a loading dock or the like. U.S. Pat. No. Reissue 24,276 (Schuyler) discloses a loading dock bumper consisting of a plurality of resilient rubber like strips arranged face-to-face in stacked relationship, and these strips are secured together at the two ends of the stack by a pair of angle brackets such that the rubber strips are directly exposed to the vehicle. With time, the rubber strips will deteriorate due to constant shock and friction from the vehicles.

U.S. Pat. No. 4,509,730 (Shtarkman) discloses a flexible wall spring chamber which includes a selectively pressurable gas chamber between two rigid members connected by a flexible side wall. U.S. Pat. No. 5,094,905 (Murray) discloses a dock bumper constructed of rubber fragments mixed with an adhesive and bonded together, the rubber fragments being produced by fragmenting at least one tire containing rubber and strands of reinforcing material used to reinforce the tire, wherein a sufficient quantity of adhesive is mixed with the rubber to create a free standing article having structural integrity said dock bumper formed under pressure in a mold having the desired shape for a time period sufficient for the adhesive to set.

The prior art solutions appear to either have a short life and/or costly and complex to manufacture.

It is thus an object of the invention to provide a loading dock bumper that is economical to produce.

It is yet another object of the invention to provide a loading dock bumper that has a substantially long wear life.

It is yet another object of the invention to provide a loading dock bumper which uses waste material in the production thereof.

Further and other objects of the invention will be apparent to a person skilled in the art in reading the following.

SUMMARY OF THE INVENTION

In one aspect of the invention, there is provided a loading dock bumper comprising:

(a) a first shell (member with a hollow) preferably made of a substantially durable non-elastic material (for example able to withstand the constant aggressive pounding exerted by trucks) preferably a substantially rigid metal material, preferably carbon steel or the like b) a second shell (member with a hollow) preferably made of a substantially durable non-elastic material (for example able to withstand the constant aggressive pounding exerted by trucks), said first and said second shell (said first and said second member with a hollow) being resiliently attached to each other by an attaching device or the like, said first shell and said second shell (said first and said second member each with a hollow) forming a housing (with a hollow) and (c) an effective amount of a resilient material, preferably particulate on ground, contained within said housing hollow in a substantially compressed mode, preferably said resilient material being crumb rubber preferably made from waste tires, or the like, in one embodiment the resilient material is laminate scrap rubber.

In another aspect of the invention, there is provided a loading dock bumper consisting essentially of:

(i) a housing made of substantially solid durable non resilient material, said housing having first side and a second side, at least one of the first and second side being moveable with respect to the other side, preferably said solid durable non-resilient material being metal such as carbon steel or the like, (ii) an effective amount of a substantially resilient (compressible) material, preferably particulate crumb rubber, preferably made from waste tires, contained within said housing, such that in a first position, said first and second sides of said housing are a predetermined distance from each other due to the resilient material being substantially uncompressed within said housing and upon the introduction of a load to at least one side of said housing, said substantially compressible material is substantially compressed by at least one of the first side and/or the second side moving towards the other side. In a preferred embodiment, said resilient material further comprises laminate scrap rubber in association with the crumb rubber.

In yet another aspect of the invention, there is provided a loading dock bumper comprising a substantially enclosed container, preferably substantially disable and non-resilient having an interior, an exterior, a front, a back and four sides, said sides being substantially extensible, and an effective amount of a substantially resilient, in one instance preferably particulate, material contained within said interior, in another instance in association with an effective amount of a substantially resilient, preferably laminate in form, material contained within said interior, preferably in an alternating layer configuration of the particulate material alternating in layers with the laminate material wherein when there is substantially no external load or shock against said exterior front of said container, said front and said back of said container are a predetermined first distance from each other due to the resilient material contained therein being in a substantially uncompressed state, wherein upon introduction of an external load or shock against said exterior front of said container, said bumper absorbs the shock or force such that said front moves towards said back to arrive at a predetermined second distance from each other, said second distance being substantially less then said first distance, the load or shock substantially compressing said resilient material as the hollow volume is reduced and substantially absorbing the load or shock against said container, such that upon removal of said load or shock from said front of said container, said front wall moves away from said back wall towards a predetermined first distance from each other.

In yet another aspect of the invention, there is provided for use with a loading dock or the like, a loading dock bumper comprising a substantially enclosed container having an interior, an exterior, a front, a back and four sides, said sides being substantially extensible, and an effective amount of a Substantially resilient, in one instance preferably particulate material contained within said interior, in another instance in association with an effective amount of a substantially resilient, preferably laminate in form, material contained within said interior, preferably in an alternating layer configuration of the particulate material alternating in layers with the laminate material wherein when there is substantially no external load or shock against said exterior front of said container, said front and said back of said container are a predetermined first distance from each other due to the resilient material contained therein being in a substantially uncompressed state, wherein upon introduction of a external load or shock against said exterior front of said container, said front moves towards said back to arrive at predetermined second distance from each other, said second distance being substantially less then said first distance, substantially compressing said resilient material and substantially absorbing the load or shock against said container, such that upon removal of said load or shock from said front of said container, said front wall moves away from said back wall towards a predetermined first distance from each other.

In yet another aspect of the invention, there is provided a method of absorbing the shock of a truck or the like backing up to a loading dock, said method comprising the use of a loading dock bumper consisting essentially of:

(i) providing a container made of a substantially solid (durable) non resilient material, said container having a first side and a second side, said first and second sides being movable with respect to each other, (ii) providing an effective amount of a substantially resilient material contained within said container, such that in a first position, said first and second sides of said container are a predetermined distance from each other due to the resilient material being substantially uncompressed within said container, (iii) introducing of a load to at least one side of said container, said substantially compressible particulate material is substantially compressed by the first side and the second side moving towards one or the other.

In yet another aspect of the invention, there is provided for use with a loading dock or the like, a loading dock bumper consisting essentially of:

(i) a container comprised of a first half made of a non-resilient durable material preferably carbon steel, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon, a collar connecting said at least one substantially elongated aperture with said at least another substantially elongated aperture, (ii) a second half substantially larger than said first half made of substantially carbon steel, said second half having a front, and four sides extending substantially normal to said front, at least one aperture located at a predetermined position on one of said sides of said second half, and at least another aperture located at a predetermined position on one of the other sides of said second half opposed said side having said at least one aperture thereon, said second half matingly fitted over said second half proximate their sides, forming a container, such that said apertures of said first half and said apertures of said second half are substantially axially aligned with each other, (iii) a connecting device running through the collar, connecting the first half with the second hall such that said connection allows said first half and said second half to be substantially moveable with respect to each other, (iv) a predetermined effective amount of unaltered substantially compressible material preferably crumb rubber contained within said container, such that in a first position, said back of said first half and said front of said second half are a predetermined distance from each other due to the compressible material being substantially uncompressed within said container and upon the introduction of a load to the front of said second half of said container, said compressible material is substantially compressed by the load acting upon the front of said second half moving towards said first half, substantially absorbing the shock of the load.

In any of the above embodiments, the resilient material may include but is not limited to a spring, foam, crumb rubber from waste tires, scrap laminate rubber, or a combination of the above.

BRIEF DESCRIPTION OF THE DRAWINGS

The invention will now be illustrated with respect to the following drawings embodiments of the invention in which.

DETAILED DESCRIPTION OF THE DRAWINGS

Figure 1:
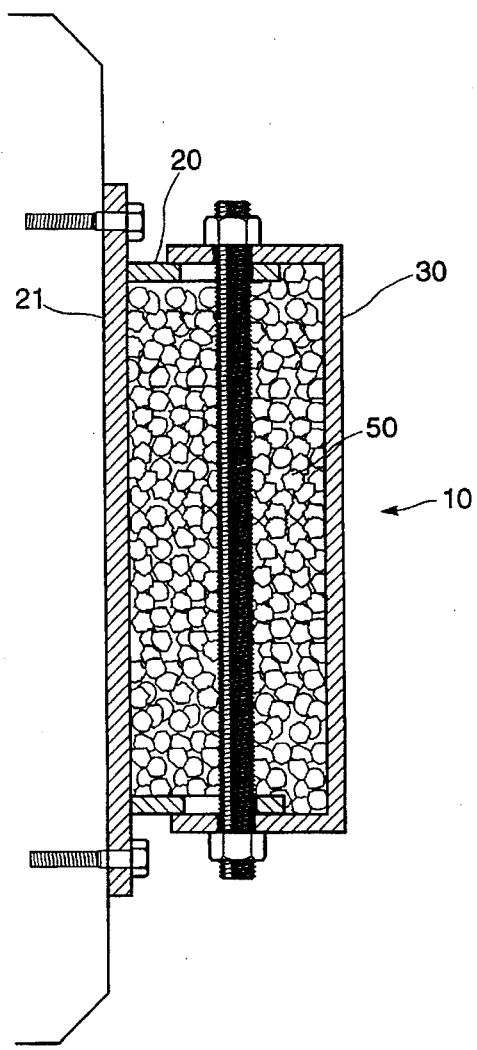
FIG. 1 is a top sectional view of the present invention in an unloaded state in a preferred embodiment.

Referring now to the figures, there is provided in one embodiment, a loading dock bumper generally designated as 10 having a first shell 20 and a second shell 30, where the first shell 20 is smaller than the second shell 30, in order for the second shell to snugly fit over the first shell 20.

The first shell 20 has a back plate 21 and four sides 22, 23, 24, 25 projecting substantially normal to said back plate 21.

Sides 22 and 24 are substantially parallel to each other, as are sides 23 and 25 substantially parallel to each other. Each side 22 and 24 have a pair of axially aligned to each side 22 and 24 substantially elongated apertures 22' and 24' respectively thereon. Furthermore, sides 22 and 24, have running along the interior of the shell formed by the four sides 22, 23, 24, and 25, and between each pair of substantially elongated apertures 22 and 24 a protective collar 26.

The second shell 30, has a front plate 31 and four sides 32, 33, 34,35 projecting substantially normal to said front plate 31. Sides 32 and 34 are substantially parallel to each other, as are sides 33 and 35 substantially parallel to each other each side 32 and 34 have respectively a pair of axially aligned apertures 32' and 34' respectively thereon. First shell 20 and second shell 30 are kept together by a pair of connecting rods 40 threaded at the ends thereof 41 and each rod is held in place by a pair of nuts 42 threaded onto said threaded ends 41.

Figure 2:
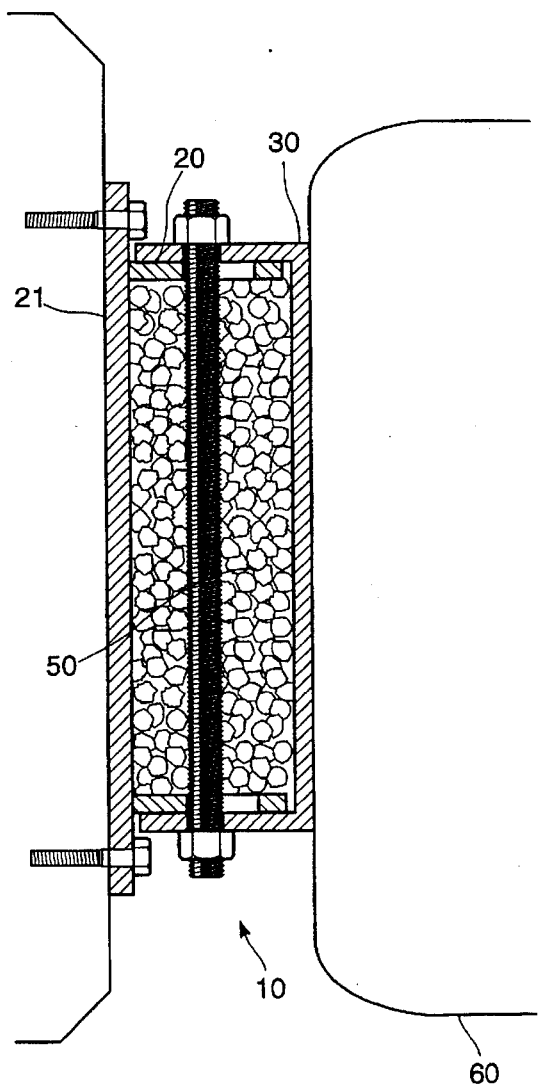
FIG. 2 is a top sectional view of the present invention in a loaded state in a preferred embodiment.
Figure 3:
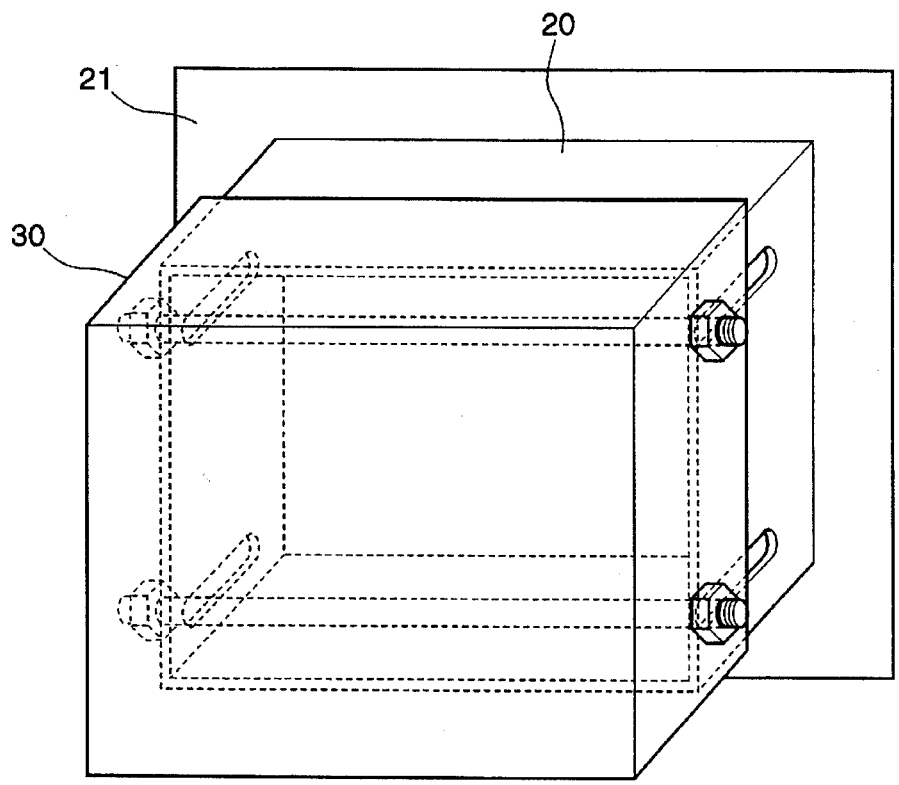
FIG. 3 is a front view of FIG. 1.
Figure 4:
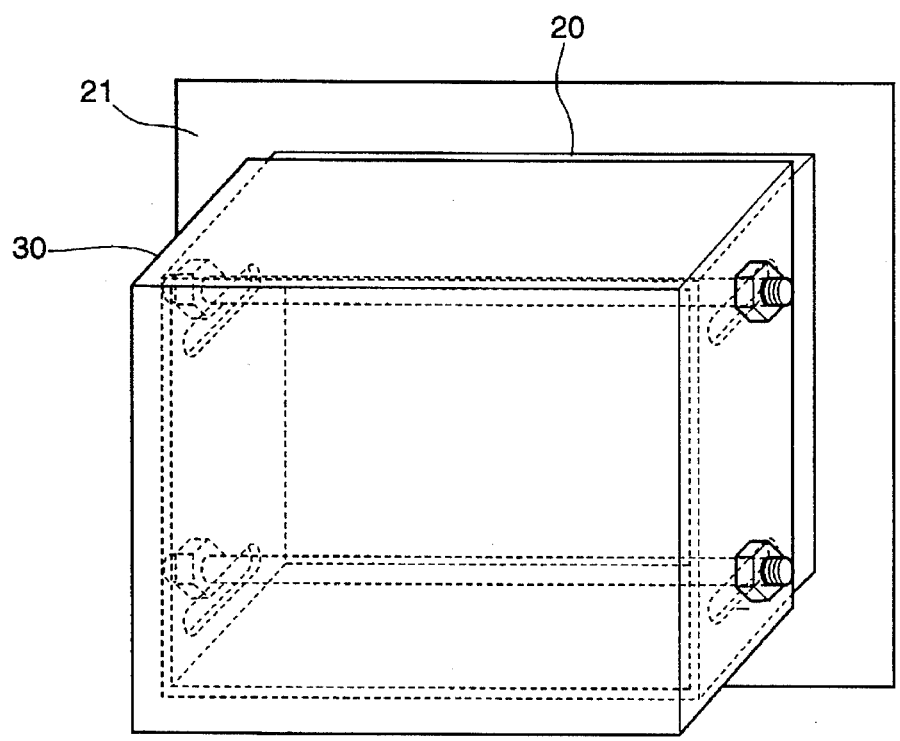
FIG. 4 is a front view of FIG. 2.

In this embodiment, the second shell 30 fits over the first shell 20 such that the sides with the apertures of each are placed over each other, aligning same. Prior to placing the second shell 30 over the first shell 20, a predetermined effective amount of resilient particular material in this embodiment crumb rubber 50 is placed into the first shell 20 in an overfilled capacity and the second shell 30 is then placed over the first shell 20 and under pressure fit over the first shell 20 to align the pairs of apertures 22' with 32' and 24' with 34' and then the connecting rods 40 are slid through the apertures 22' 32' 24' 34' in order to movably connect the first shell 20 and the second shell 30. When the pressure on the second shell 30 is removed, the resiliency of the crumb rubber 50 causes the first shell 20 and second shell 30 to move away from each other. The back plate 21 of the first shell 20 is also a mounting plate to mount the loading dock bumper to the loading dock, as can be seen in FIG. 2. In FIGS. 1 and 3 the loading dock bumper is in the "rest" or unloaded position, since there is no external force urging the second shell 30 toward the first shell 20. But as can be seen in FIGS. 2 and 4, a truck 60 backing up to the loading dock 70 with the loading dock bumper 10 in place, (the truck 60 moving against the bumper 10) urges the second 30 shell to said first shell 20 compressing the crumb rubber 50 contained therein and thus absorbing and/or reducing the shock of said truck 60 against the loading dock 70.

Furthermore, upon the loading and/or unloading of the truck at the loading dock, a commonly used fork-lift (not shown) will ride into the truck from the warehouse to pick-up (or drop off) a load and return to the warehouse. The extra weight of the fork lift moving onto and out of the truck will cause the truck's bumper, to move substantially horizontally against the loading dock bumper, but due to the resilient of the crumb rubber, and the structural integrity of the shells, there is substantially no damage encountered by the loading dock bumper of the present invention, due to the movement of the truck bumper or the like against the loading dock bumper.

Figure 5:
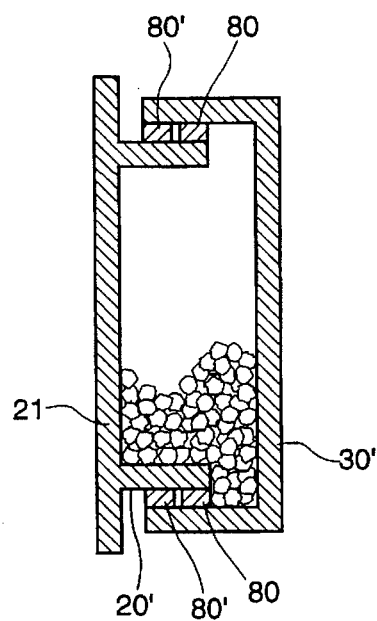
FIG. 5 is a sectional view of the present invention in another embodiment.

In another embodiment, as best seen in FIG. 5 there is shown the loading dock bumper 10 without the need of the connecting rods and thus the pairs of apertures. In this instance the first shell 20' and second shell 30 are connected to each other via two pairs of lips 80, 80', preferably made of carbon steel or the like. One pair 80' located on the inner portion of the parallel sides 22 and 24 (or 23 and 25) of the second shell 30 and the other pair 80 located on the outer portion of parallel sides 32 and 34 (or 33 and 35) of the first shell 30. Such that the lips (80, 80') allow for the movement of the second shell 30' towards and away from the first shell 30 upon introduction and removal of a load or shock against the seal shell 30'.

In the manufacturing of this embodiment, the top plate is placed under pressure over top the first shell with the first shell over filled with a predetermined effective amount of crumb rubber, and under pressure, the sides are attached for example, by welding to the top plate, and thus ready for Use. Similarly the loading dock bumper of the embodiment operates as per the FIGS. 1,2,3 and 4 except for the lack of connecting rods and apertures.

Figure 6:
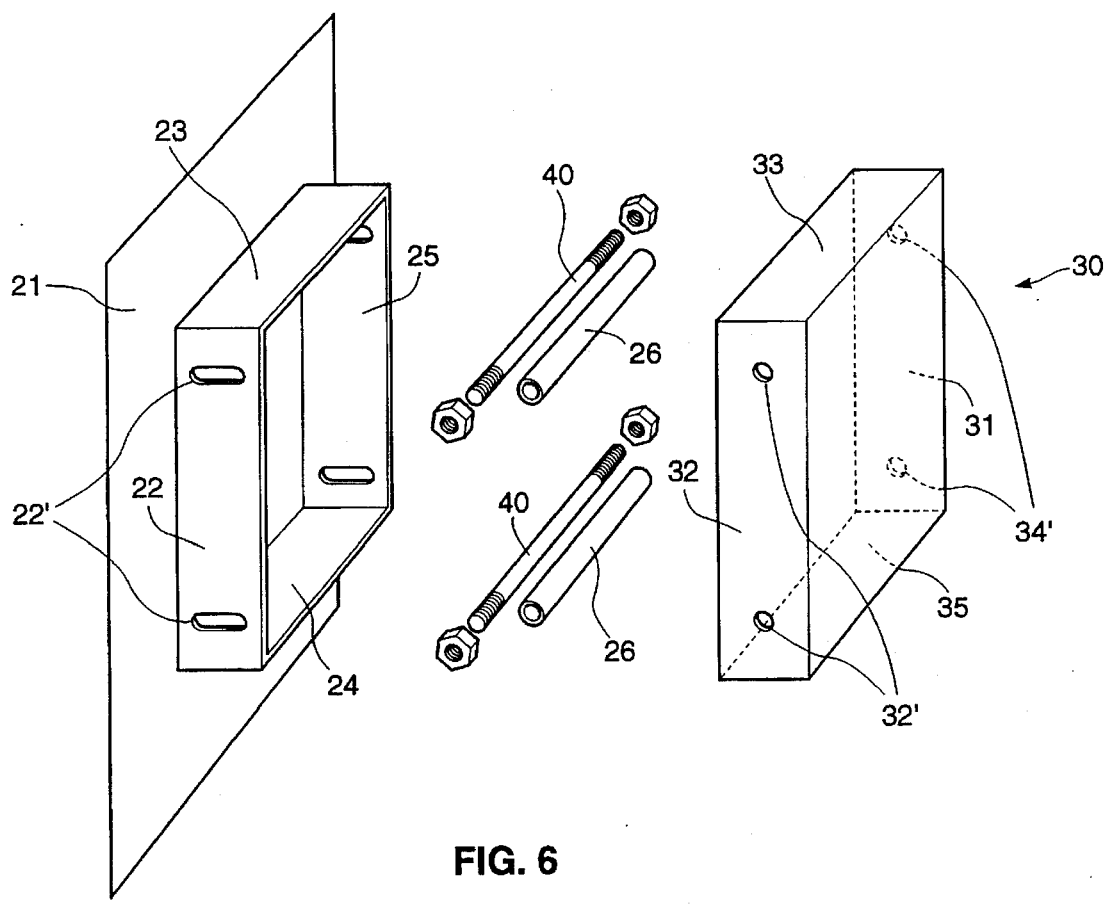
FIG. 6 is an exploded view of the present invention in a preferred embodiment.
Figure 7:
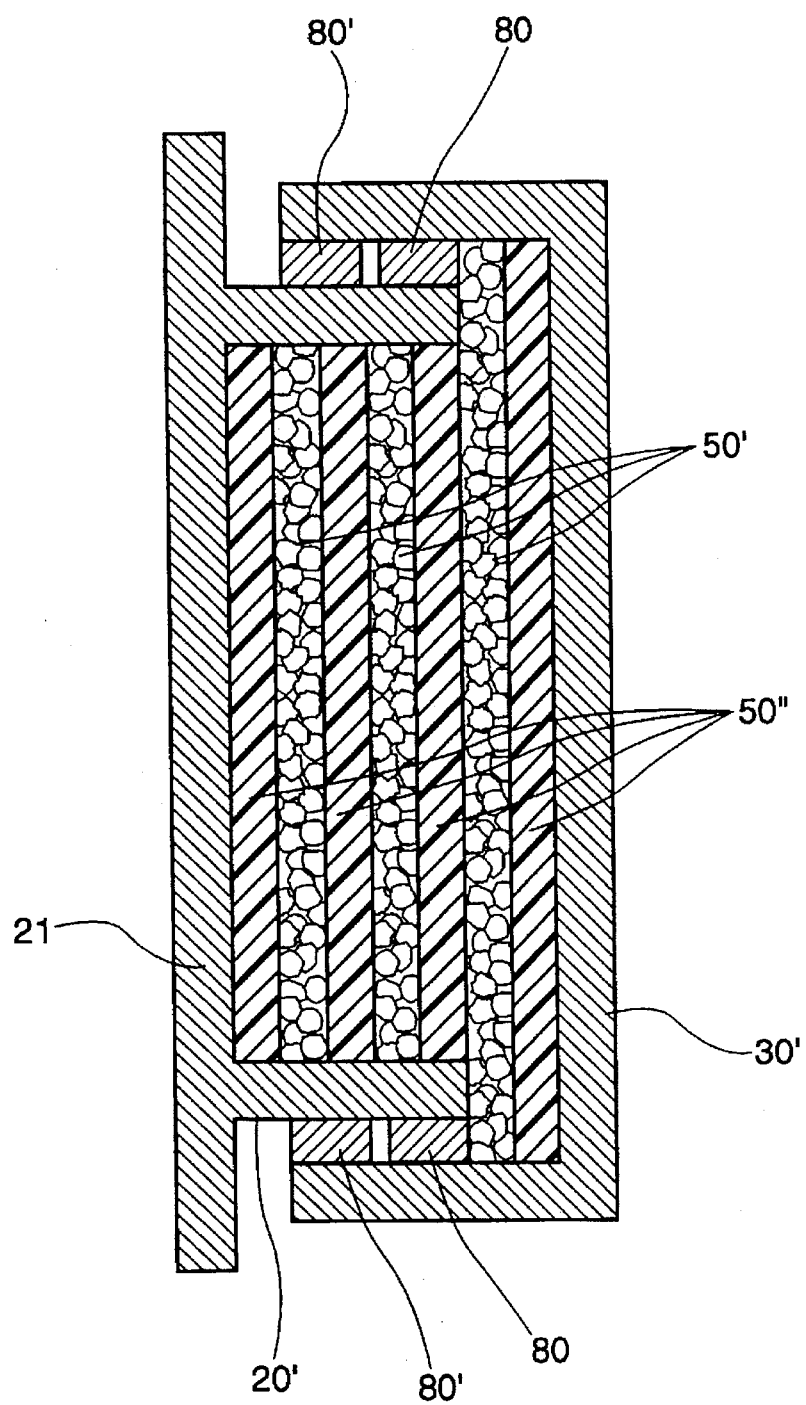
FIG. 7 is a sectional view of the present invention in another embodiment.

In yet another embodiment as best seen in FIG. 6 the bumper structure is similar to the embodiment shown in FIG. 5, except that the resilient material is comprised of a predetermined amount of crumb rubber 50' in particulate form, and a predetermined amount of laminate scrap rubber sheet 50". Here it is shown in an alternating layer configuration, such as a layer of crumb rubber 50' placed into the first shell, and then a layer of laminate scrap rubber sheet 50" placed over the crumb rubber, and then a layer of crumb rubber 50, and a layer of laminate scrap rubber sheet 50", and so on until the desired resiliency is reached, prior to placing the second shell 30' over top the first shell 30. The layering configuration can be substantially vertical, horizontal, or a combination of both.

The preferred material in any of these embodiments for the shells is high carbon steel, but an appropriate metal or any other effective material which can meet the requirements of the invention may be used. Furthermore, although particulate crumb rubber is shown in these embodiments, any suitable resilient material may be used.

As many changes can be made to the preferred embodiments of the invention without departing form the scope of the invention; it is intended that all material contained herein be interpreted as illustrative of the invention and not in a limiting sense.

The embodiments of the invention in which an exclusive property or privilege is claimed are as follows:

1. A loading dock bumper for use with a loading dock, said a loading dock bumper consisting essentially of:
   (i) a container comprised of a first half made of a substantially carbon steel, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon, a collar connecting said at least one substantially elongated aperture with said at least another substantially elongated aperture,
   (ii) a second half substantially larger than said first half made of substantially carbon steel, said second half having a front, and four sides extending substantially normal to said front, at least one aperture located at a predetermined position on one of said sides of said second half, and at least another aperture located at a predetermined position on one of the other sides of said second half opposed said side having said at least one aperture thereon, said second half matingly fitted over said first half proximate their sides, forming a container, such that said apertures of said first half and said apertures of said second half are substantially axially aligned with each other,
   (iii) a connecting device running through the collar, connecting the first half with the second half, such that said connection allows said first half and said second half to be substantially moveable with respect to each other,
   (iv) an effective amount of unaltered substantially compressible crumb rubber material contained within said container, such that in a first position, said back of said first half and said front of said second half are a predetermined distance from each other due to the crumb rubber material being substantially uncompressed within said container and upon the introduction of a load to the front of said second half of said container, said crumb rubber material is substantially compressed by the load acting upon the front of said second half moving towards said first half, substantially absorbing the shock of the load.

2. A method of absorbing the shock of a transport vehicle backing up to a loading dock, said method comprising the use of a loading dock bumper, said loading dock bumper consisting essentially of:
   (i) a container comprised of a first half made of a substantially carbon steel, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon, a collar connecting said at least one substantially elongated aperture with said at least another substantially elongated aperture,
   (ii) a second half substantially larger than said first half made of substantially carbon steel, said second half having a front, and four sides extending substantially normal to said front, at least one aperture located at a predetermined position on one of said sides of said second half, and at least another aperture located at a predetermined position on one of the other sides of said second half opposed said side having said at least one aperture thereon, said second half matingly fitted over said first half proximate their sides, forming a container, such that said apertures of said first half and said apertures of said second half are substantially axially aligned with each other, (iii) a connecting device running through the collar, connecting the first half with the second half, such that said connection allows said first half and said second half to be substantially moveable with respect to each other, (iv) an effective amount of unaltered substantially compressible crumb rubber material contained within said container, such that in a first position, said back of said first half and said front of said second half are a predetermined distance from each other due to the crumb rubber material being substantially uncompressed within said container and upon the introduction of a load to the front of said second half of said container, said crumb rubber material is substantially compressed by the load acting upon the front of said second half moving towards said first half, substantially absorbing the shock of the load.

* * * * *